UNITED STATES PATENT OFFICE.

JULIUS JOHN MOJONNIER, OF OAK PARK, ILLINOIS, ASSIGNOR TO MOJONNIER BROS. CO., OF CHICAGO, ILLINOIS, A CORPORATION OF ILLINOIS.

PROCESS OF TESTING MILK AND MILK PRODUCTS.

1,391,965. Specification of Letters Patent. Patented Sept. 27, 1921.

No Drawing. Application filed February 6, 1920. Serial No. 356,666.

*To all whom it may concern:*

Be it known that I, JULIUS JOHN MOJONNIER, a citizen of the United States, residing at Oak Park, in the county of Cook and State of Illinois, have invented and discovered certain new and useful Improvements in Processes of Testing Milk and Milk Products, of which the following is a specification.

This invention relates to a process or method of testing milk, cream and milk products generally, to accurately and rapidly determine the percentage of fat therein, and has for its object to increase the efficiency of such tests prior hereto by reducing the time consumed in completing the same as well as maintaining or raising the standard of accuracy.

The present test is carried out and accomplished with an extraction flask forming the subject matter of the co-pending application, filed April 12, 1915, Serial No. 20,633 of which this application is a continuation, it being also a continuation of application Serial No. 132,979 filed November 23, 1916.

Prior to the present invention two methods of testing milk and milk products for fat have been more or less adopted as a standard and are commonly known as the "Babcock test" and the "Roese-Gottlieb test."

Briefly, the "Babcock test" consists of mixing a sample of milk or milk product with solvents for the casein albumen, milk-sugar or lactose, etc., thereby presumably liberating the fat, whereupon, by the addition of a fat clarifying agent and the assistance of some separating force, the fat (or residue after dissolving the casein, albumen, etc.,) is distinguishable or separable from the balance of the mixture. Heat has been a prime factor in dissolving the casein, albumen, milk-sugar or lactose, etc., and is extremely undesirable in that it creates an artificial condition in driving the fat out of the milk or milk product. This test, to-wit, the "Babcock test" measures the volume of the fat in a crude tube, in which the separation or supposed extraction of the fat takes place, and while many variations and modifications of the "Babcock test" exist, they all involve measuring by volume for determining the percentage or proportion of fat.

The "Roese-Gottlieb test" is concededly more accurate as well as more delicate and tedious than the "Babcock test." This test mixes a weighed sample of the milk or milk product with ammonia, alcohol, ethyl ether and petroleum ether using a Rohrig tube, and shaking the mixture after the introduction of each re-agent. After the re-agents have been added to the sample, the Rohrig tube is allowed to stand to permit the extracted fat in solution to separate from the remainder or residue of the mixture to create a sharp line of demarcation between the immiscible liquids. This step to wit, the settling, consumes from five minutes to one hour by use of the Rohrig tube under the most favorable conditions, and generally requires the latter time. After the fat in solution is completely separated from the residue of the mixture, it is drawn off through a filter into an "Erlenmeyer" flask. A second extraction is usually made and drawn into the same flask, after which the flask is placed upon a hot plate and the ether very slowly evaporated, as rapid boiling for the evaporation of ether would cause bumping and loss from spattering and creeping out of the flask. After all ether has been evaporated the flask is dried in an oven at 100° C. and then cooled in a glass desiccator. When thoroughly cooled, the flask is weighed and the amount of fat therein is compared to the weight of the original sample, thereby determining the percentage of fat therein.

Both of these tests are open to serious objections, the "Babcock test" being more or less inaccurate, while the "Roese-Gottlieb test" usually requires three hours to complete a determination, and can only be used by trained and skilled analysts to obtain proper results. In fact, all of the prior tests, when sufficiently rapid for the purpose of manufacturers or commercial application are extremely inaccurate, and even with this inaccuracy require from forty minutes to an hour for completion. The more accurate tests such as the "Roese-Gottlieb test" consumes from three to four hours for their completion and even then are not all that is to be desired in the way of accuracy.

The present test has for its object not only to shorten the time consumed in the "Roese-Gottlieb test," but also of the more rapid tests, and further to increase the accuracy of even the more accurate tests; thus producing results that are accurate to .05% or less in at least twenty-five mintues.

This is generally accomplished by mixing the milk or milk product with a fat solvent, at the same time dissolving the albumen, casein, milk-sugar or lactose, etc., thereby causing the fat in solution to float upon the remainder of the mixture so that it can be readily drawn off, the solvent for the fat rapidly evaporated, and the residue rapidly dried, cooled and weighed. In this manner the result is absolutely accurate.

In carrying out the present test ten (10) grams in the case of fresh milk, skim milk, whey or butter milk; five (5) grams in the case of evaporated milk, bulk unsweetened condensed milk, sweetened condensed milk or ice cream; three (3) grams in the case of bulk extra heavy unsweetened condensed milk are very accurately weighed and placed in a special tube or flask such as that shown in Patents Nos. 1,312,340 and 1,255,329 to which is added ammonia, alcohol, ethyl ether, and ligroin or petroleum ether in approximately the following proportions:

| | |
|---|---|
| Ammonia | $1\frac{1}{2}$ cc. |
| Alcohol | 10 cc. |
| Ethyl ether | 25 cc. |
| Ligroin | 25 cc. |

It is preferable to thoroughly shake the tube or flask after the addition of each of the foregoing re-agents to cause a thorough mixture.

When the present test is used with evaporated milk 4 cc. of water is added with the ammonia; while 6 cc. of water is added with the ammonia when ice cream is being tested; 7 cc. of water (hot preferred) is added with the ammonia in the case of bulk extra heavy unsweetened condensed milk; and 8 cc. of hot water is added with the ammonia when first testing sweetened condensed milk.

It has been found that ammonia and ethyl alcohol dissolve the albumen, casein, milk sugar or lactose, while the ethyl ether and ligroin dissolve the fat and clarify the solution, thereby creating a sharp line of demarcation between the solution of fat and the solution albumen, casein, milk sugar or lactose, etc.

After the above re-agents have been placed in a tube and the same has been shaken after the addition of each re-agent, the tube is centrifuged from 30 to 60 turns or revolutions of the centrifuge depending on the product tested, and a maximum of approximately one minute is consumed in thus facilitating the separating of the immiscible liquids one from the other. This step alone greatly reduces the time normally consumed in settling the mixture, and causes the fat in solution to be sharply separated from the residue or other constituents of the mixture in the tube. In using a Rohrig tube in connection with the "Roese-Gottlieb method" this usually requires never less than five minutes under the most favorable conditions wherein the immiscible liquids separate by standing or gravitation and generally requires approximately one hour.

After the fat in solution has been separated from the remainder of the mixture, the same is withdrawn from the extraction chamber of the tube or flask described in the aforesaid patents, into a large, shallow, metal dish resting upon a hot plate having a temperature of 135° C. so that the solution boils briskly as it enters the dish; thus driving off the fat solvents (ethyl ether and ligroin) while being withdrawn from the flask. In this manner the evaporation of the fat solvents is accomplished in practically the time that is required to withdraw the fat in solution from the tube. The extraction is usually repeated with alcohol ligroin and ethyl ether to insure the absolute removal of all the fat from the tube or flask, and this supplemental extraction may, if desired, be again repeated. In making the second or supplemental extraction referred to 5 cc. of alcohol for each extraction is used; 15 cc. each of ethyl ether and ligroin or petroleum ether is used in the testing of fresh milk, skim milk, whey and buttermilk; and 25 cc. each of ethyl ether and ligroin or petroleum ether is used in the testing of evaporated milk, bulk unsweetened condensed milk, bulk extra heavy unsweetened condensed milk and ice cream.

The dish with the fat solvents almost entirely evaporated is then placed in a vacuum oven, the temperature of which is above the boiling point of water, preferably 135° C. This thoroughly dries the fat in the dish by driving out all the moisture therein, and requires usually about five minutes for its completion.

When the residue of fat in the dish is perfectly dry, the shallow dish aforesaid is placed in a special metal desiccator or in a cooling oven or chamber which is provided with a cooling plate having a cooling fluid circulating therethrough. In this oven the dish and its contents are brought to a temperature of the chemical balance upon which the sample was originally weighed in from three to five minutes. The dish into which the fat in solution is placed upon being withdrawn from the tube or flask being comparatively large presents a large radiating surface for the heat, said surface being in contact throughout with the cooling plate aforesaid or with the body of the metal desiccator. This permits of a large and rapid radiation of the heat, and necessarily the reducing of the temperature of the fat to that of the chemical balance in a very short time. This step alone saves many minutes of time in the completion of a determination. It is then possible to use the dish containing the dry residue of fat and compare the results with the original weight of the sample selected; thus determining the percentage or proportion of fat in the sample.

The entire test rarely consumes over 25 minutes and is accurate to at least .05 of one per cent.

What is claimed is:

1. The method of extracting fat from milk or milk products, consisting of mixing the milk or milk product with a fat solvent, centrifuging the mixture to rapidly separate the fat in solution from the remainder of the mixture, withdrawing the fat in solution into a relatively large dish resting on a hot plate whereby the solution boils briskly as it enters the dish, thereby evaporating the solvent, drying under a vacuum, and then rapidly cooling to the necessary temperature.

2. The method of extracting fat from milk or milk products, consisting of mixing a weighed sample of the milk or milk product with a fat solvent, centrifuging the mixture to rapidly separate the fat in solution from the remainder of the mixture, withdrawing the fat in solution into a relatively large shallow dish maintained at a temperature of approximately 135° C. to cause the solution to boil briskly immediately after being withdrawn, drying under a vacuum at 135° C., and final cooling.

3. The method of determining the fat in milk or milk products, consisting in weighing a sample of the milk or milk product on a chemical balance, mixing the sample so weighed with a fat solvent, centrifuging the mixture to rapidly separate the fat in solution from the remainder of the mixture, withdrawing the fat in solution into a relatively large shallow dish maintained at a temperature of approximately 135° C. to cause the solution to boil briskly immediately upon entering the dish, thereby rapidly evaporating the solvent, drying the fat remaining in the dish under a vacuum at 135° C. and cooling to the temperature of the chemical balance aforesaid.

4. A method of testing liquids consisting in mixing the liquid with a fat solvent and withdrawing the fat in solution and simultaneously evaporating the solvent aforesaid.

5. The process of extracting fat from milk or milk products, consisting in mixing a sample of the milk or milk product with a fat solvent, subjecting the mixture to centrifugal force, then withdrawing the fat in solution and subjecting the same to heat evaporating the solvent.

6. The process of testing milk or milk products for fat in mixing ammonia water, ethyl alcohol, ligroin and ethyl ether with a sample of the milk or milk product in a tube, thereby extracting the fat in solution, then separating the fat in solution from the remainder of the mixture by centrifugal force, withdrawing the fat in solution from the tube, subjecting it to heat as it leaves the tube thereby evaporating the ethyl ether and ligroin, and finally weighing the residue after evaporating the ethyl ether and ligroin.

7. A method of testing liquids for fat consisting in extracting the fat from said liquids by a fat solvent, centrifuging the liquid to separate the fat in solution from the remainder of the liquid and evaporating the solvent from the fat in solution so separated.

JULIUS JOHN MOJONNIER.